United States Patent
Siegemund et al.

(10) Patent No.: US 8,694,682 B2
(45) Date of Patent: Apr. 8, 2014

(54) VIRTUAL EXECUTION SYSTEM FOR RESOURCE-CONSTRAINED DEVICES

(75) Inventors: Frank Siegemund, Aachen (DE); Robert Sugar, Redmond, WA (US); Wolfgang Manousek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 12/296,828

(22) PCT Filed: Mar. 22, 2007

(86) PCT No.: PCT/US2007/007262
§ 371 (c)(1),
(2), (4) Date: Oct. 10, 2008

(87) PCT Pub. No.: WO2007/120436
PCT Pub. Date: Oct. 25, 2007

(65) Prior Publication Data
US 2009/0307308 A1 Dec. 10, 2009

(30) Foreign Application Priority Data

Apr. 13, 2006 (EP) .................................... 06270039

(51) Int. Cl.
*G06F 9/45* (2006.01)
*G06F 9/46* (2006.01)
*G06F 15/16* (2006.01)

(52) U.S. Cl.
USPC ........... 709/246; 717/136; 717/140; 717/146; 717/147; 717/148; 718/1; 718/100; 718/102; 718/104

(58) Field of Classification Search
USPC ............. 709/223, 226, 246; 455/4.1, 41, 419; 717/100, 106, 114, 118, 136–138, 146, 717/148; 718/1, 100–108

See application file for complete search history.

(56) References Cited

U.S. PATENT DOCUMENTS

| 5,961,582 | A | 10/1999 | Gaines |
| 6,883,163 | B1 | 4/2005 | Schwabe |
| 6,957,427 | B1 * | 10/2005 | Wollrath et al. ................... 718/1 |
| 7,082,600 | B1 * | 7/2006 | Rau et al. ....................... 717/148 |

(Continued)

FOREIGN PATENT DOCUMENTS

EP          1845444 B1    5/2010

OTHER PUBLICATIONS

Gefflaut, et al., "Porting the .NET Compact Framework to Symbian Phones—A Feasibility Assessment," May 31, 2005, PLZEN, Czech Republic, 10 pgs.*

(Continued)

*Primary Examiner* — Tae Kim
(74) *Attorney, Agent, or Firm* — Pablo Tapia; Jim Ross; Micky Minhas

(57) ABSTRACT

A virtual execution system that is configured to be used in a resource-constrained device. The resource-constrained device includes an operating system and an application program that includes instructions. The virtual execution system includes an execution engine that is configured to execute the application program, and to facilitate the compatibility of the application program with the operating system. Non-functional aspects characterize the instructions and the operating system. The execution engine has access to the non-functional aspects, and implements improvements during the execution of the application program based on the non-functional aspects.

20 Claims, 10 Drawing Sheets

(56) References Cited

U.S. PATENT DOCUMENTS

| | | | |
|---|---|---|---|
| 7,194,543 B2* | 3/2007 | Robertson et al. | 709/226 |
| 7,536,181 B2* | 5/2009 | Solve et al. | 455/419 |
| 7,581,231 B2* | 8/2009 | Smith et al. | 719/328 |
| 7,707,563 B2* | 4/2010 | Wei | 717/140 |
| 7,774,504 B2* | 8/2010 | Chene et al. | 709/246 |
| 2003/0084435 A1* | 5/2003 | Messer et al. | 717/174 |
| 2003/0182347 A1* | 9/2003 | Dehlinger | 709/1 |
| 2004/0010785 A1* | 1/2004 | Chauvel et al. | 717/158 |
| 2004/0054994 A1* | 3/2004 | Demsey et al. | 717/148 |
| 2005/0015753 A1* | 1/2005 | Meijer et al. | 717/136 |
| 2005/0102649 A1* | 5/2005 | Hogg et al. | 717/100 |
| 2005/0289531 A1* | 12/2005 | Illowsky et al. | 717/163 |
| 2008/0222621 A1* | 9/2008 | Knight et al. | 717/151 |

OTHER PUBLICATIONS

Zhou, et al., "Planning for Code Buffer Management In Distributed Virtual Execution Environments", Virtual Execution Environment '05, Jun. 11-12, 2005, Chicago, Illinois, USA, 10 pages.

Gefflaut, et al., "Porting the .NET Compact Framework to Symbian Phones—A Feasibility Assessment" May 31, 2005, PLZEN, Czech Republic, Retrieved from the Internet <<http://dotnet.zcu.cz/NET_2005/Papers%5CFull%5CA73-full.pdf>> on Jun. 28, 2006, 10 pages.

Kim, et al., "Energy-efficient Java execution using local memory and object co-location" IEE Proceedings E. Computers & Digital Techniques, Institution of Electrical Engineers. Stevenage, GB, vol. 151, No. 1, Jan. 15, 2004, pp. 33-42, XP006021486 ISSN: 0143-7062.

Lindholm, et al., "The Java (TM) Virtual Machine Specification," Addison-Wesley, 1997, Sun Microsystems, Inc. pp. 106-113.

Nokia Corporation, "Symbian OS: Active Objects And the Active Scheduler" Aug. 26, 2004, Retrieved from <<http://www.forum.nokia.com/info/sw.nokia.com/id/759268ae-c2b5-4fed-8e8d-f6f417fc3658/Symbian_OS_Active_Objects_And_The_Active_Scheduler_With_Example_v1_0b_en.zip.ht ml>> on Jun. 27, 2006, 36 pages.

Office Action for European Patent Office for Application No. 06270039.-2211, dated Apr. 21, 2008, 2 pages.

SUN Microsystems: "Understanding MIDP 2.0's Security Architecture" Feb. 2003, Retrieved from the Internet: <<http://developers.sun.com/techtopics/mobility/midp/articles/permissions>> on Jun. 28, 2006, 8 pages.

* cited by examiner

VIRTUAL EXECUTION SYSTEM FOR RESOURCE-CONSTRAINED DEVICES

RELATED APPLICATIONS

This application is a National Stage of International Application No. PCT/US2007/007262, filed 22 Mar. 2007, which claims priority from European Patent Application No. 06270039.8, filed on 13 Apr. 2006. Both applications are incorporated herein by reference.

The technical field is generally the field of virtual execution systems. More specifically, the technical field relates to the use of virtual execution systems in resource-constrained devices.

Resource-constrained devices are electronic devices that typically have significantly greater constraints on computing resources and memory than for a desktop computer. Examples of resource-constrained devices include mobile phones, personal digital assistants, handheld computers, game consoles, set-top boxes, satellite-based positioning devices, e.g., global positioning system ("GPS") devices, and sensor nodes. Resource-constrained devices are interesting targets for virtual execution systems (also referred to as runtime environments), which facilitate virtual execution environments within a device. Virtual execution systems are program execution systems, which can be implemented in software, or in a combination of hardware and software, that enable high-level application programs to be executed without regard to the application program's compatibility with the device's operating system or hardware. Thus, a virtual execution system provides an application program with independence from a device's operating system or hardware.

The main reason for the use of virtual execution systems in resource-constrained devices is that native programming, i.e., programming using a device's internal file format, on resource-constrained devices is usually difficult. Native programming on resource-constrained devices is difficult because the native programming models (which include application program interfaces ("APIs"), i.e., routines, protocols, and tools used to create applications, and programming concepts that are available for writing applications) and programming languages provided on those resource-constrained devices are often difficult to understand and do not offer simple interfaces for application programmers.

Runtime technologies, i.e., technologies that operate during the execution of an application program and that facilitate a virtual execution system, have the potential to significantly improve the process of implementing application programs on resource-constrained devices. Example runtime technologies include the following: JAVA VIRTUAL MACHINE ("JVM"), which was created by Sun Microsystems, Inc. of Santa Clara, Calif.; and the COMMON LANGUAGE INFRASTRUCTURE ("CLI") which is an international standard. The COMMON LANGUAGE RUNTIME ("CLR") is an implementation of CLI that was created by Microsoft Corporation of Redmond, Wash. Runtime technologies allow application programs to be written in any of a variety of high-level languages and still be executed in different system environments. An application developer compiles these high-level languages that conform to the runtime technologies into an intermediate language, e.g., COMMON INTERMEDIATE LANGUAGE ("CIL") or JAVA BYTECODE. The intermediate language, in turn, is transformed during program execution into native code, which is specific to the device's architecture.

While virtual execution systems are extremely desirable from an application programmer's perspective, the main drawback with the use of runtime technologies on resource-constrained devices is a performance penalty for the device. One of the reasons for this performance penalty is that there is a gap between the programming model supported by the runtime technology of the virtual execution system and the programming model that is associated with the resource-constrained device's operating system and hardware. This performance penalty is undesirable, and can become prohibitive, for resource-constrained devices.

Another problem that is associate with using virtual execution systems in resource-constrained devices is that the operating systems for resource-constrained devices provide different capabilities and have different restrictions than operating systems included in desktop systems. Hence, it is a challenge to map the programming models that are exposed by a virtual execution system to the APIs and runtime structures of operating systems in the resource-constrained devices. At the same time, it is desirable for an application programmer to make use of the additional capabilities of the underlying operating system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments that are discussed in greater detail in the Detailed Description include a virtual execution system, a resource-constrained device, and a related method for improving performance in a resource-constrained device. An exemplary embodiment is a virtual execution system that is configured to be used in a resource-constrained device. The resource-constrained device includes an operating system and an application program that includes instructions. The virtual execution system includes an execution engine that is configured to execute the application program and to facilitate the compatibility of the application program with the operating system. Non-functional aspects characterize the instructions and the operating system. The execution engine has access to the non-functional aspects, and implements improvements during the execution of the application program based on the non-functional aspects.

Embodiments of the present invention will now be described, by way of example, with reference to the accompanying features, in which.

Figure 1:
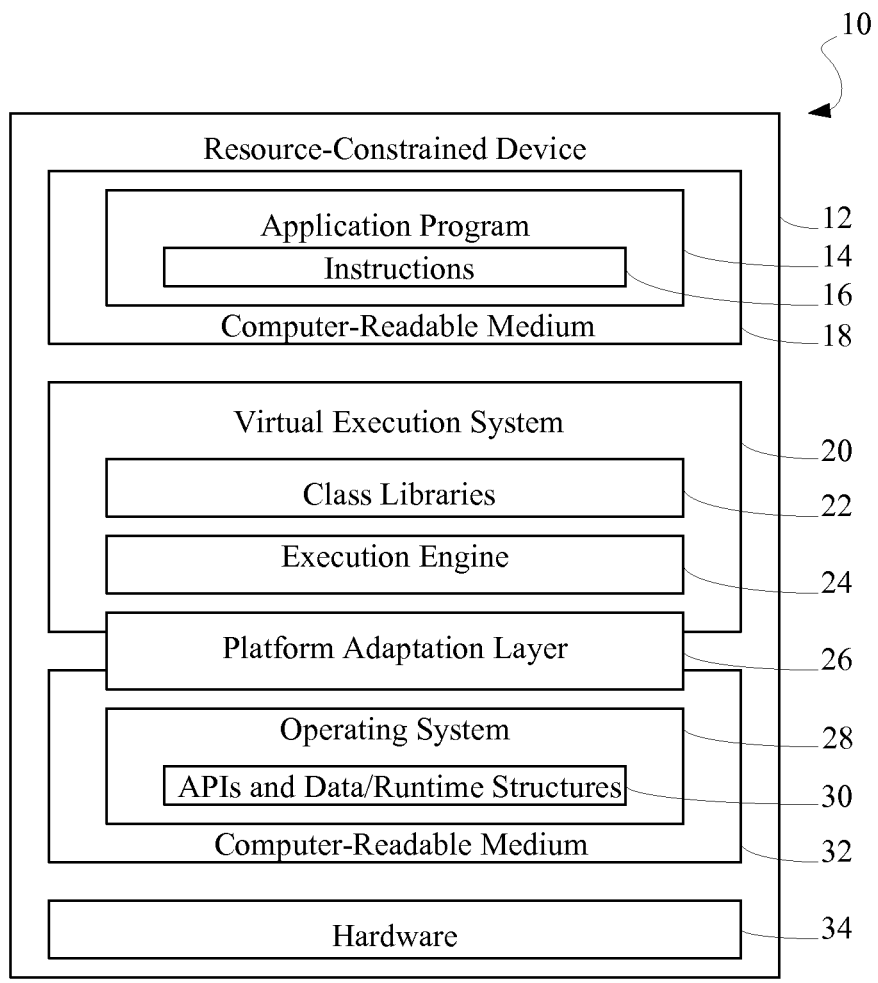
FIG. 1 is a block diagram of a general hierarchical structure that is included in a resource-constrained device. The general hierarchical structure includes an application program, a virtual execution system, a platform adaptation layer, an operating system, and hardware.

FIG. 1 is a block diagram of an exemplary resource-constrained device's software and hardware hierarchical architecture 10. Within the device 12 is shown an application program 14, which includes instructions 16 and is stored in a first computer-readable medium 18; a virtual execution system 20, which includes class libraries 22 and an execution engine 24; a platform adaptation layer ("PAL") 26; an operating system 28, which exposes, i.e., provides, supports, and/ or allows the use of underlying services by providing a well-defined interface, a set of APIs and internal data structures 30 (the internal data structures are referred to as "runtime structures" during runtime) and is stored in a second computer-readable medium 32; and hardware 34, e.g., the resource-constrained device's microprocessor, a random access memory ("RAM"), a read only memory ("ROM"), and a BLUETOOTH hardware component. Thus, when it is said that the operating system exposes a set of APIs and internal data structures, it means that the operating system has a set of APIs and internal data structures that can be used by application programs, application programmers, and/or a virtual execution system.

The PAL 26 interfaces with the virtual execution system 20 and communicates directly with the operating system 28 and the hardware 34. The PAL is a logical abstraction of a component that handles the adaptation of the underlying operating system services to the programming model of the virtual execution system. The operating system functions as an interface between the hardware and the software that is running on the device 12. Each computer-readable medium 18 and 32 can be, for example, a RAM, a ROM, an EEPROM, a flash memory, a CDROM, a DVD, an optical disk, a magnetic cassette, a magnetic tape, a magnetic disk drive, or any other medium that can be used to store information. Also, the first computer-readable medium 18 and the second computer-readable medium 32 can be included within a single computer-readable medium.

The class libraries 22 include data that is used by the execution engine 24. The execution engine is configured to execute the application program 14 and to facilitate the compatibility of the application program with the operating system 28. The execution engine reads the intermediate language code, makes use of data from the class libraries, and converts this information so that it can be used by the device's operating system and hardware 34. The PAL is configured to map instructions from the application program to the APIs and runtime structures 30 in the underlying operating system. FIG. 1 is exemplary, and various hardware and/or software components may be added, combined, or removed from FIG. 1 depending upon the unique characteristics of the resource-constrained device 12.

Narrowing of the gap in information between a programming model that is supported by a virtual execution system 20 and the programming model that is supported by a resource-constrained device 12 is important. The example embodiments that are discussed below narrow this informational gap by increasing the awareness of the resource-constrained device's programming model by the virtual execution system's programming model. More specifically, the embodiments make it easier for the virtual execution system, and in particular the execution engine 24 in combination with the PAL 26, to map instructions from an intermediate language, which is used by the virtual execution system, onto the appropriate APIs and runtime structures 30 of the underlying operating system 28. Examples of such mappings includes the following: mapping a threading model that is supported in the virtual execution system onto the threading model exposed by the operating system of the resource-constrained device, and mapping the method of accessing files that is supported in the virtual execution system so that it effectively considers the security restrictions of the underlying operating system.

Performance improvements are made by increasing the awareness of the virtual execution system 20, and in particular the execution engine 24, about non-functional aspects related to the application program's instructions 16 that are to be executed by the virtual execution system, and the device's operating system 28. This is done by augmenting the application program instructions with metadata that describes the non-functional aspects. These non-functional aspects can include, for example, information about timeliness, security, resource demands, network lifetime, real-time aspects, energy consumption, and/or execution modes. The non-functional aspects offer additional knowledge to the virtual execution system about how to optimize performance by taking into account the requirement characteristics of the application program 14 and the characteristics of the device's underlying operating system. In particular, the non-functional aspects are utilized by the virtual execution system to find appropriate APIs and runtime structures 30 in the device's operating system.

The following are example steps that are taken by the virtual execution system 20. First, the APIs and runtime structures 30 provided by the operating system 28 for a resource-constrained device 12 are analyzed. Second, methods are found of how to map the programming model, e.g., the APIs and runtime structures, of the virtual execution system onto the underlying operating system. Third, these different methods are implemented in the PAL 26 (optionally, additions to the execution engine 24 may be necessary). Fourth, the execution engine is allowed to switch between the different implementations. Fifth, metadata that describes the non-functional aspects is added to instructions. The addition of the metadata can be done by a programmer on an instruction level. Also, the addition of the metadata can be done automatically for all instructions of a specific type based on profiles. Sixth, the execution engine can use the non-functional aspects to provide an improved mapping onto the operating system, or to make use of operating system features that are not initially included in the programming model of the virtual execution system, e.g., security issues for accessing sockets/files in the operating system.

Figure 2:
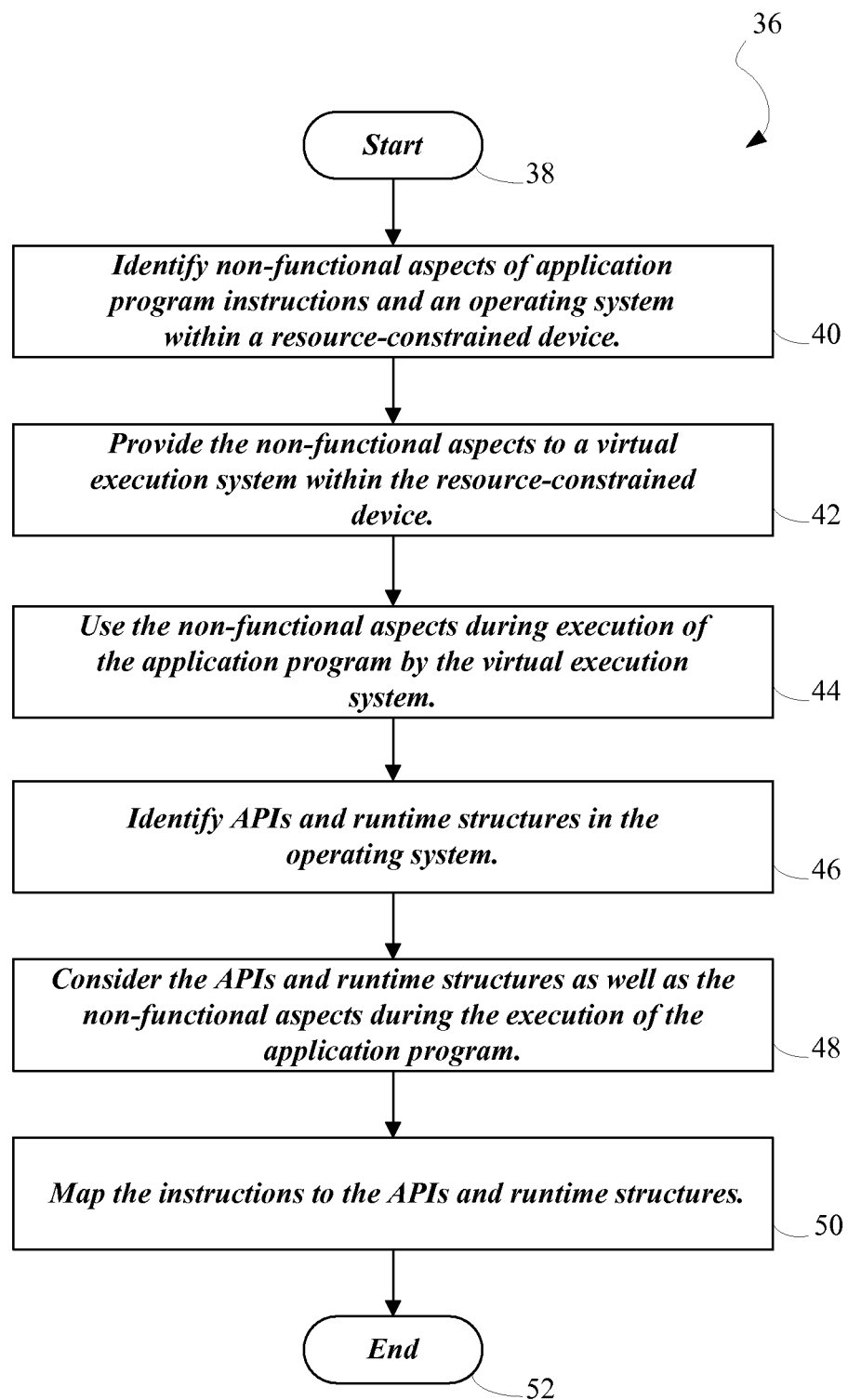
FIG. 2 is a flow diagram of an exemplary algorithm that represents steps taken by the virtual execution system and/or the platform adaptation layer of FIG. 1.

An exemplary algorithm 36 that represents the steps taken by the virtual execution system 20 in combination with the PAL 26 is illustrated in FIG. 2. This algorithm can be implemented in computer-readable instructions that are stored in a computer-readable medium 18 and 32. After the start 38 of the algorithm, the next step 40 is for the virtual execution system to identify non-functional aspects of the application program's instructions 16 and non-functional aspects of the operating system 28. In step 42, the non-functional aspects are provided to the virtual execution system, which, in step

44, uses the non-functional aspects during the execution of the application program 14. Next, in step 46, the virtual execution system in combination with the PAL identifies APIs and runtime structures 30 in the operating system. In step 48, the virtual execution system considers the APIs and runtime structures as well as the non-functional aspects during the execution of the application program. At step 50, the PAL in combination with the virtual execution system maps the instructions to the APIs and runtime structures. The algorithm ends at step 52.

The non-functional aspects that are utilized by the virtual execution system 20 are described using metadata that is encoded in some form of intermediate language, which is compatible with the virtual execution system. Given the metadata, the virtual execution system can perform a wide range of optimizations that facilitate the deployment of runtime technologies on resource-constrained devices 12. For example, if certain real-time aspects are important when executing a function, the virtual execution system automatically can prioritize certain instructions based on the capabilities of the underlying operating system 28. Also, information about security issues can be important for improved performance. For example, without additional information about security constraints, the strongest security mechanisms have to be supported, which can result in a performance penalty. In addition, information about execution modes, e.g., whether a function implies an asynchronous function call on the underlying operating system or not, can be used to find appropriate APIs and runtime structures 30 for improved performance.

In one embodiment, the operating system 28 within the resource-constrained device 12 includes APIs and runtime structures 30, which are configured to carry out managed code, which is the code that runs within a .NET environment. Execution of the managed code is controlled by the CLR, which is the runtime environment in which .NET applications run. The CLR is layered between the .NET application and an underlying operating system. During execution, the CLR can stop the execution engine 24 and retrieve information that is encoded in an intermediate language, e.g., metadata.

In order to allow for the necessary performance improvements, additional information is embedded into the managed code to enable optimizations in the execution engine 24 and at the PAL 26. This additional information is important for various programming mechanism, e.g., the invoke mechanism ("PInvoke"), which is the mechanism by which .NET languages call unmanaged functions in dynamic link libraries ("DLLs"). The additional information is also important for managed code libraries. For injecting additional data into managed code the CLI supports an extensible metadata model.

Generally, metadata is used to describe types in the Common Type System ("CTS") of the CLI. The CTS is a specification that is used to define how types of data are declared, used, and managed in the runtime environment. Metadata is accessible at runtime by the execution engine 24 to load classes or to carry out runtime checks. On resource-constrained devices 12, the metadata is used to enable the virtual execution system 20 together with the PAL 26 to carry out more optimizations by taking into account the APIs and runtime structures 30 of the underlying operating system 28. In CLI programming languages like C#, attributes are a mechanism to add metadata to, for example, data, methods, classes, and interfaces. An alternative to the usage of custom attributes is to extend the syntax of the PInvoke mechanism directly in order to allow for performance improvements; this would also affect the metadata accessible by the execution engine.

The kind of metadata that is attached to the PInvoke mechanism and other instructions 16 allows the execution engine 24 to carry out optimizations dynamically in order to map managed code instructions upon appropriate APIs and runtime structures 30 of the underlying operating system 28. The attached metadata describes non-functional aspects of instructions to be carried out by the virtual execution system 20. Considering, for example, the standard PInvoke mechanism, the metadata addresses primarily functional aspects such as the function name, the function number, the type of arguments, calling conventions, and data marshalling (see Sect. 15.5 of ECMA standard ECMA-335). Here, the PInvoke mechanism is extended by non-functional aspects, which allow optimizations in the PAL. Examples of such non-functional aspects are information about security constraints, information about the side effects of functions calls, information about timing issues, and information about execution modes, e.g., whether a function is asynchronous.

The specific non-functional aspects in the three examples that are discussed below provide information about whether a function maps to an asynchronous function call, about security constraints, and about properties of the underlying operating system 28. In the three examples, specific techniques are discussed for dealing with security, memory, and threading issues in a virtual execution system 20 for a SYMBIAN operating system, which is provided by Symbian Ltd. of London, England. The three examples implement a port, i.e., a transfer of an application program 14 from one type of computer to another type of computer, of the CLR to the SYMBIAN operating system. The SYMBIAN operating system is an operating system for data-enabled mobile phones, e.g., mobile phones that are configured to access the Internet. The SYMBIAN operating system offers a different kind of programming model than that offered by the CLR, and the CLR/SYMBIAN interface illustrates some of the difficulties that are associated with porting runtime technologies to resource-constrained devices 12.

While the focus of the following discussion will be on virtual execution systems 20 that conform to the CLI, the teaching included in this document can be applied to different runtimes technologies, for example, JVM, and applied to different operating systems 28 other than the SYMBIAN operating system, for example, TINYOS, which typically is used on small sensor devices.

EXAMPLE 1

Security Constraints on SYMBIAN Smartphones

When porting a virtual execution system 20 to a resource-constrained device 12, it is desirable to maintain the additional security mechanisms of the device's underlying operating system 28. This is true even if the security mechanisms are not directly accessible from the programming languages 14 that are supported by the virtual execution system. Additional security constraints are often a result of special demands on reliability and of the resource restrictions on the devices. In this example, a security constraint in the SYMBIAN operating system, which currently is the predominant operating system for smartphones, is discussed. In particular, a security constraint, in this example, is integrated into a virtual execution system and is made accessible for application programmers.

Figure 3:
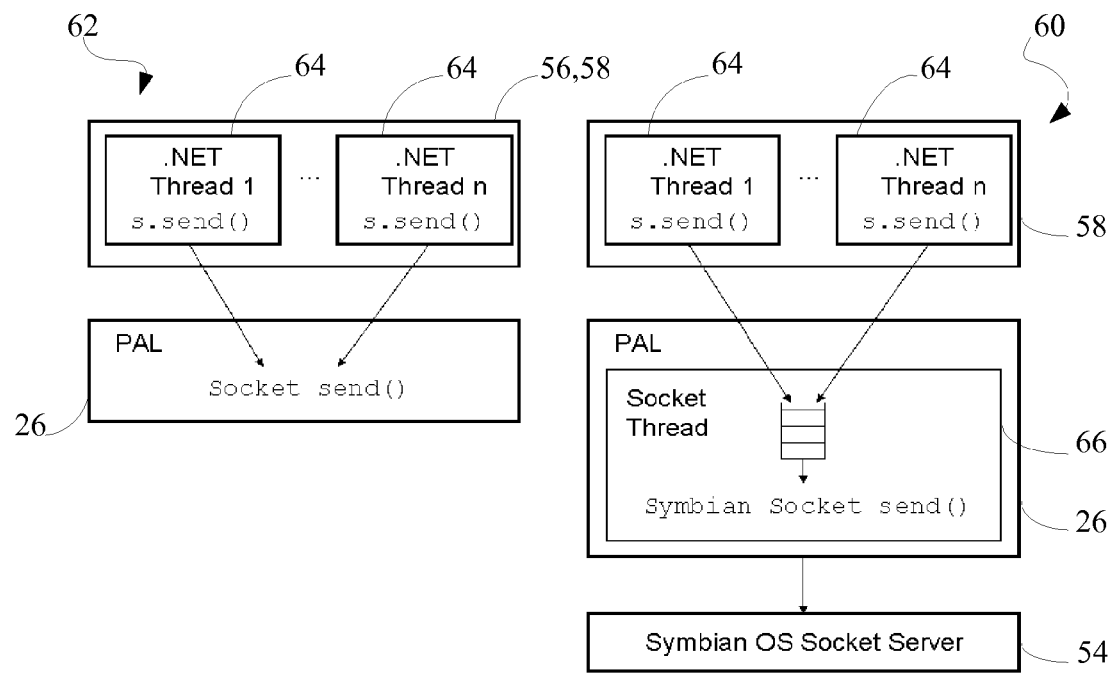
FIG. 3 is a block diagram of platform adaptation layer implementations of calls to a socket function.

Referring to FIG. 3, the example SYMBIAN security constraint that is discussed in this section is supposed to improve reliability, as it restricts access to resources and requires the explicit establishment of connections to access resources.

The SYMBIAN operating system 28 provides a set of so-called servers 54, which are local service providers of the operating system. The servers are used to access certain resources. There are servers for accessing file system functions, e.g., for dealing with bitmaps or windows, for sending messages such as short message service ("SMS") or multimedia message service ("MMS"), for accessing a network over a socket interface, and even for printing messages. Generally, there exists a server for almost everything except for simple mathematical calculations. Servers usually provide asynchronous functions to facilitate SYMBIAN's model of cooperative multitasking.

Each server 54 runs on a different thread 56 or process, and is therefore decoupled from individual application programs 14. Communication between a client and a server takes place over sessions that are specified to exist between an application thread 58 and a server thread. The additional access restriction or security constraint that results is that only the thread that created the session is allowed to use this session. This ensures that security can be enforced on any of the sessions, and the security can contribute to the robustness of the device 12.

Virtual execution systems 20 usually implement a mechanism to circumvent this additional security protection, which might not always be desirable. Instead, it is believed that virtual execution systems should be aware of, and honor, the special restrictions and resource constraints of resource-constrained devices 12 in order to improve robustness and performance.

FIG. 3 is a block diagram that illustrates a mechanism for circumventing SYMBIAN's security protection (see the right-hand portion 60 of FIG. 3), and compares it to a PAL implementation on a typical desktop operating system 28 (see the left-hand side 62 of FIG. 3). As can be seen in the left-hand side of FIG. 3, a call to a socket function in a managed framework can be mapped directly to the socket function of the underlying operating system. For an underlying SYMBIAN operating system, a send( ) operation that is called from different threads 64 is problematic because of a security restriction. In particular, only the thread that opens a connection to a server 54, in this case the SYMBIAN operating system ("OS") socket server, can talk to that server. If the send( ) calls from two different threads, then the two different threads are mapped directly to the SYMBIAN socket function. This would cause an error, which could result in a crash of the smartphone during typical use.

In order to allow multiple threads 64 to access the socket server 54, the PAL 26 has to introduce a new thread, i.e., the PAL Socket Thread 66 shown in FIG. 3, that establishes a connection to the SYMBIAN socket server. If different threads now call the .NET send( ) function, the requests are scheduled for execution, and eventually invoked, by the PAL Socket Thread. By using this configuration, only the PAL Socket Thread accesses the socket server and the security protection has been circumvented. This circumvention of the security protection might be acceptable in some instances, but, in general, this approach is problematic because it cancels protections of the underlying operating system 28. The following are several different approaches to deal with this issue.

Approach 1:

The mechanism described above can be used to allow different threads 64 to share a single session with a server 54. This single server session is established by an additional thread 66 in the PAL 26, which sequences requests from different application threads. The advantage of this approach is that a single server session can be reused by different application threads. The disadvantage of this approach is that it comes at the cost of an additional thread, which could be reused for different kinds of service providers, scheduling overhead, and results in the weakening of SYMBIAN's security mechanisms.

Approach 2:

Probably the simplest solution is to create the server session, i.e., the connection to the service provider, in each PAL function that needs to communicate with a server 54. After session establishment, the function is executed, and afterwards, the server session is closed. The disadvantage that is associated with this approach is a performance penalty caused by the connection establishment/shutdown, which would be necessary in almost all PAL functions.

Approach 3:

Another approach is to establish a separate server session for every application thread 58 that uses a service provided by that particular server 54. That means, if two threads 64 use a server, both threads could establish two different server sessions; and the server session established by one thread is used by the functions invoked from within the one thread. The advantage of this approach is that it honors the access restrictions of the SYMBIAN operating system 28, that being if one server session is used, it always occurs from the same thread even if it is an application thread. Furthermore, calling a function using this approach is faster because there is no need for a separate PAL thread that sequences requests. This means that no thread synchronization is needed with this additional thread in the PAL. The disadvantage of this approach is that this approach might result in more server sessions than in the first approach, because server sessions are not shared between different application threads.

All of the above approaches have viable application areas. Because of the resource constraints of resource-constrained devices 12, however, it might become necessary or desirable for an application programmer to decide what particular approach to use. This can be done using metadata. For example, if the third approach is desirable, a custom attribute for the create thread function is introduced, which allows a programmer to specify that an additional server session is to be created. This additional server session is used by the functions invoked within this thread 64. Alternatively, the decision about which approach to take can also be made on assembly level, which means that a metadata attribute could specify what approach to use for all threads created in an assembly. By doing this, optimizations can be implemented in the virtual execution system 20 based on the application-specific metadata.

EXAMPLE 2

Application-Specific Adaptations of PAL APIs and Runtime Structures

One of the existing approaches for coping with the resource limitations of resource-constrained devices 12 is to adapt managed assemblies, i.e., assemblies in which the code modules consist of managed code (managed code is code that is to be executed in a virtual execution system 20), according to a specific application program 14. In other words, given a specific application program and a set of managed code libraries it can be found out what subset of the managed code libraries is required by the specific application program. As the memory constraints of resource-constrained devices can be severe, only the absolutely necessary subset of the managed code libraries together with the specific application programs is deployed on the resource-constrained device. This approach reduces the amount of required memory and can significantly improve performance. However, this approach only affects managed code and not the unmanaged code portion of a virtual execution system.

A simple example of the optimizations that become possible affect the initialization and startup phase of the execution engine 24. Considering Example 1 from the previous section, an important question is when to create a session to a server 54. The following two approaches are possible. First, server sessions to all servers, e.g., the file server, the networking server, the messaging server, and the bitmap server, together with the necessary threads 64 and APIs and runtime structures 30 are created during startup. An advantage of this first approach is that all of the necessary APIs and runtime structures are in place whenever they are required by a PAL function. A disadvantage of this approach is that much of those structures might never be used, and might therefore waste memory. A second approach is that server sessions and corresponding APIs and runtime structures are created during runtime. In the third approach of Example 1, this might happen when threads are created. Otherwise, server sessions can be established only when certain PAL functions are really used. For example, the first call to a file function would establish the connection to the SYMBIAN file server.

Again, both approaches of this example might be used. While generally superior, the second approach has the disadvantage that the first time of invoking a function that accesses a particular server 54 might result in significantly more execution time. This can be problematic if the application program 14 has some real-time constraints, which are not uncommon in resource-constrained devices 12.

The initialization of the APIs and runtime structures 30 can be streamlined by performing a static analysis of the application program 14 to be executed and the corresponding metadata in the managed libraries. A static analysis is an analysis that is performed on the application program without executing the application program. For example, the static analysis might reveal that an application program does not access file functions; in which case, there would be no need to establish the server session and thread 64 that are necessary for communication with the server 54. Metadata in managed code libraries is again necessary to specify which managed functions (over the PInvoke mechanism) call into SYMBIAN functions that talk to a certain server. Such annotations are necessary for many useful cross-layer optimizations in the virtual execution system 20.

Furthermore, the unmanaged footprint of the virtual execution system 20, i.e., the portion without managed code libraries, could be significant. In order to have a virtual execution system for resource-constrained devices 12, it might be necessary to adapt the modules that are included in the non-managed part of the virtual execution system according to the requirements of application programs 14 that are to be executed on these devices.

The suggested approach is to apply the same kind of optimization to the unmanaged portion of the virtual execution system's execution engine 24 as to the managed part. This means that based on metadata that is included in managed code libraries, which has to be included depending on a specific operating system 28, i.e., the attributes included for SYMBIAN would differ from TINYOS or NUT/OS, it can be found out through static analysis of a managed application which PAL modules are going to be needed. For example, if an application program 14 only needs file functions, messaging functions, or graphical user interface ("GUI") functionality, then the corresponding PAL functions are included in the virtual execution system 20 and deployed on the resource-constrained device 12. Again, this approach is only possible by augmenting managed code libraries with metadata that is specific to the underlying operating system. Only this metadata makes the suggested size optimizations possible.

At first sight, the latter approach appears to look like standard library loading through PInvoke. For example, assume that the PAL modules for file access, networking, and GUI functionality are embedded into separate Dynamic Link Libraries ("DLLs"), which are libraries of data or executable functions that can be used by WINDOWS application programs 14. WINDOWS was created by Microsoft Corporation. Furthermore, for this example, it is assumed that there are the following two types of memory 18 and 32 with different size constraints: (1) a large amount of non-volatile memory, for example, a memory card attached to a mobile phone for storing pictures; and (2) a limited amount of RAM. The different PAL modules for file access, networking, and GUI functionality can be stored into the non-volatile memory and only loaded into RAM though a LoadLibrary function when a PInvoke takes place that calls into the PAL modules.

The above example has associated with it the following three problems. First, the PAL modules usually contain all file functions or all networking functions, so, in practice, bigger modules are loaded into the restricted amount of RAM though the LoadLibrary function than are necessary. Through a static analysis of the application program 14 together with the suggested metadata augmentations the PAL modules can contain only the necessary functions. Second, dynamic loading of modules during runtime, and not during initialization as it usually takes place, might not be desirable. This is especially true for application programs with certain time constraints. Third, the assumption of a large amount of available non-volatile memory is not always correct. For this reason, memory restrictions often are an important consideration when a virtual execution system 20 is deployed on a device 12.

When it is known what application programs 14 are to be executed on a resource-constrained device 12, a static analysis of these application programs can significantly improve the memory demands for of virtual execution system 20 that has to be deployed on the resource-constrained device. Dynamic optimizations cannot help in this case. In practice, the number of application programs that are to be executed usually is very small. In fact, in most cases, there is only a single application program.

EXAMPLE 3

Optimizations by Exploiting Knowledge about Asynchronous Functions

This example illustrates how to efficiently map between the different programming models provided by the virtual execution system 20, or more precisely, the application programming languages 14 on top of it, and the underlying operating system 28. In particular, the following example deals with a thread handling situation. The problem that is addressed in this example is that virtual execution systems usually focus on a simple programming model where developers do not have to care about how to manually switch between different tasks. In contrast, operating systems for resource-constrained devices 12 usually have only limited support for preemptively scheduled threads 64. As a consequence, these operating systems are either purely event-based and hand over the responsibility to explicitly switch between tasks to the programmer, or offer programming structures with a strong focus on cooperative multitasking. The SYM- BIAN operating system belongs to the latter category. Although the SYMBIAN operating system supports preemptively scheduled threads, its programming model strongly focuses on cooperative multitasking.

The goal of this section is to show how to deal with this gap between the different programming models, and how to allow for optimizations in the virtual execution system 20 by making it aware of the underlying programming model. In particular, the following are desirable: (1) to reduce the number of preemptively scheduled threads 64 and the management overhead they induce in the virtual execution system, and (2) to improve the efficiency of executing concurrent tasks using a lightweight thread model provided by the underlying operating system. These goals are achieved by embedding information about the underlying programming model as metadata in managed code, which the virtual execution system utilizes to carry out optimizations.

The following is one example approach of how to reduce the number of threads 64. Example 1 introduced architectures that deal with the security constraints associated with the SYMBIAN operating system 28. As can be seen in FIG. 3, the most common approach requires the creation of a new thread 66 in the PAL 26 that sequences the requests from multiple .NET threads. In other words, the .NET threads, e.g., application threads in C# or Visual Basic, are mapped to preemptively scheduled threads in SYMBIAN, and their function calls are sequenced by the additional PAL thread.

Now, considering again the example in FIG. 3, where there are two .NET threads 64 that have functions in their main loop, and whose requests are sequenced by the separate PAL thread 66. In this case, there is no need to create preemptively scheduled threads for the two .NET threads. Instead, because their requests are sequenced in the PAL thread, and because the SYMBIAN operating system 28 offers a well-supported, lightweight thread model, the different tasks can be executed in a single thread. So, there is no need to create a preemptively scheduled thread for each application thread if the main function of the application thread fulfills certain requirements.

The main requirement is that the main function of an application thread 58 calls asynchronous functions that are sequenced in the additional PAL thread 66. Most functions, e.g., file functions, networking functions, messaging functions, and even print statements, fulfill this property. As a result, it is likely that the proposed optimization can be applied for many, if not most, application threads. On the other hand, it requires that the virtual execution system 20 be aware of what managed functions are mapped to an asynchronous function call on the underlying operating system 28 and which are not. This information is made available by embedding appropriate metadata into managed code libraries. Given this information, the execution engine 24 can decide dynamically whether it needs to create a new preemptively scheduled thread for an application thread or whether SYMBIAN's lightweight threading model can be used.

Figure 4:
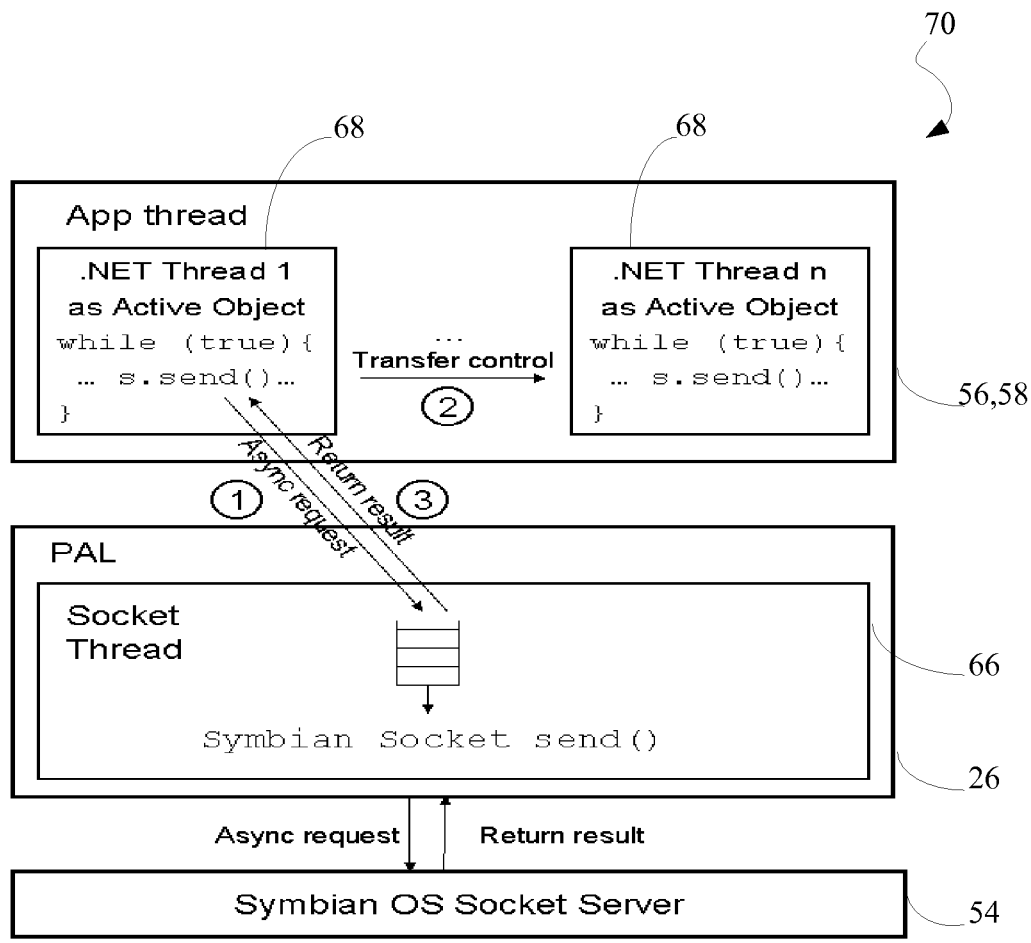
FIG. 4 is a block diagram of a first platform adaptation layer implementation of calls to a socket function where application threads are represented as active objects.

Referring additionally to FIG. 4, in the proposed optimization, SYMBIAN's lightweight thread model can be used. Basically, SYMBIAN's lightweight thread model is made up of the following two core components: active objects and an active scheduler. Active objects 68 together with the active scheduler make it easier for an application programmer to deal with cooperative multitasking. Usually, an application program 14 includes a set of active objects that exist in a single, preemptively scheduled thread, i.e., cooperative multitasking is used.

The transfer of control between different tasks, which are represented as active objects 68, takes place as follows. First, as discussed in Example 1, the SYMBIAN operating system 28 provides a range of local service providers, the so-called servers 54. These servers support asynchronous function requests. In other words, if an application program 14 calls an asynchronous function, the function request is transmitted to the server, the server executes the function request, and notifies the calling application program when the function request has been executed. As servers exist in a different thread 64 or process than the application program, this means that the application program has some idle time while it waits for an asynchronous request to complete. In fact, each time an application program calls an asynchronous function, this method is used to transfer control between the different tasks abstracted by an active object.

In embodiments, the active objects concept is used to represent application threads 58 in the virtual execution system 20 if the above-described requirements are fulfilled. Again, these requirements are important, because in case an application thread does not call asynchronous functions in a regular interval this task can block all other tasks. However, many functions in the SYMBIAN operating system 28 have an asynchronous representation and almost all PAL layer functions, e.g., file functions, networking functions, print statements, and messaging functions, require sequencing in a PAL thread 66.

Figure 5:
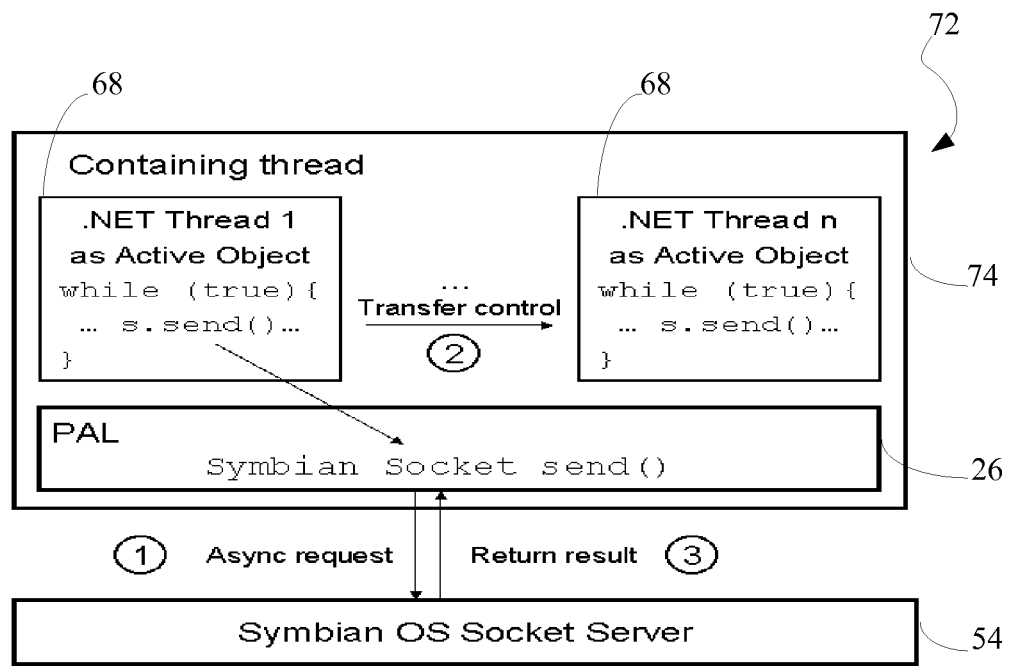
FIG. 5 is a block diagram of a second platform adaptation layer implementation of calls to a socket function where application threads are represented as active objects.

FIG. 4 and FIG. 5 provide a graphical overview of two possible architectures 70 and 72, respectively. In FIG. 4, only application threads 58 are represented as active objects 68, and the data structure for sequencing requests is still there. Whenever an application thread calls a function that is sequenced at the PAL 26, this request is implemented in an asynchronous manner. In other words, (1) the request is forwarded to the PAL thread 66 as an asynchronous request, (2) as the request is asynchronous the control is automatically transferred to another active object, which represents another application thread, (3) this active object carries out its instructions until it also reaches an asynchronous function call, (4) in case an asynchronous function is finished, the active object that issued the corresponding asynchronous request is identified, (5) the original active object retrieves the result of the previous asynchronous function call and executes further instructions until (6) it again calls an asynchronous function. In case there are multiple active objects for which results of a previous asynchronous call are available, SYMBIAN's active scheduler decides, based on simple priorities, which active object gets activated next.

It is also possible to eliminate the additional PAL thread 66 if the active objects 68 can be created in the same thread 74 that maintains the connection to the different SYMBIAN servers 54. This is another possible way to deal with the security constraints of the SYMBIAN operating system 28 that are discussed in Example 1. FIG. 5 shows the corresponding architecture.

The following is data that was collected from an evaluation of the proposed optimizations based on a number of concrete experiments that were performed using a virtual execution system 20 on a device 12 running the SYMBIAN operating system 28. These experiments were carried out on a high-end, SYMBIAN-enabled smartphone with a port of Microsoft's CLR for SYMBIAN executing on it.

Figure 6:
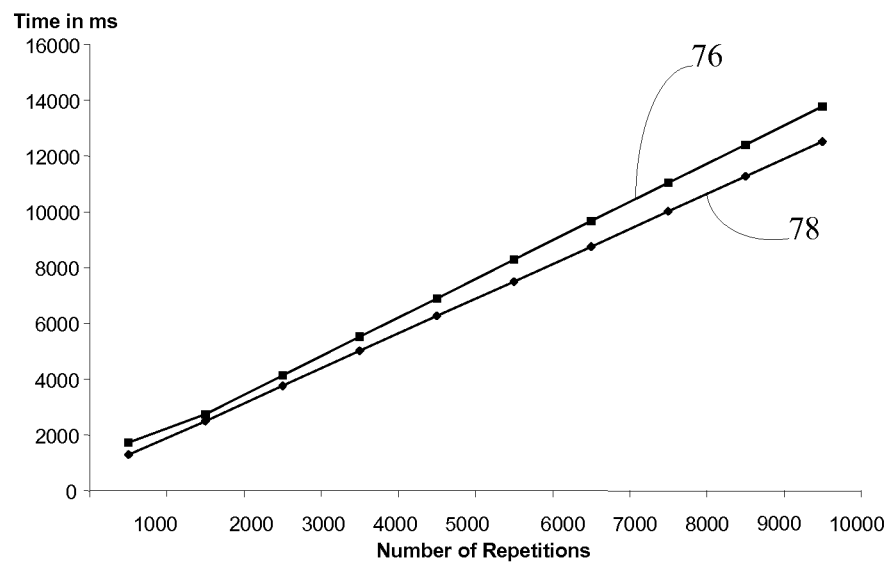
FIG. 6 is a graph that illustrates the performance of a print statement on a SYBMIAN console with and without an additional platform adaptation layer thread.
Figure 7:
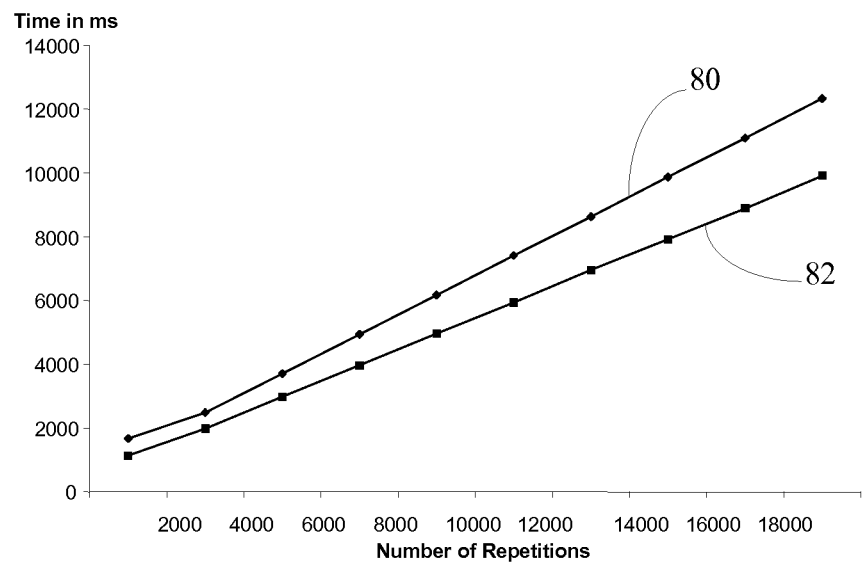
FIG. 7 is a graph that illustrates the performance of a low complexity operation with and without an intermediate platform adaptation layer thread.

FIGS. 6 and 7 show the overhead that is caused by the additional PAL thread 66. In particular, FIG. 6 is a graph of time versus the number of repetitions of a print statement using a SYMBIAN device 12. The top trace 76 in FIG. 6 includes data taken from the SYMBIAN device without the additional PAL thread, while the bottom trace 78 includes data taken from the SYMBIAN device with the additional PAL thread. Similar to FIG. 6, FIG. 7 is a graph of time versus the number of repetitions for an operation that is less complex than a print statement using the SYMBIAN device. The top trace 80 in FIG. 7 includes data taken from the SYMBIAN device without the additional PAL thread, while the bottom trace 82 includes data taken from the SYMBIAN device with the additional PAL thread.

As can be seen, the overhead, i.e., the difference between the top trace 76 and 80 and the bottom trace 78 and 82, respectively, depends on the complexity of the operation to be carried out. For example, a print statement is quite a complex functions in SYMBIAN because a print statement often requires that the whole screen be redrawn because strings are often attached to the end of the console window. Because of this, print statements often result in automatic scrolling. Taking another function that does not involve scrolling, the advantage of getting rid of the additional PAL thread 66 is even more obvious, as shown in FIG. 7. In the latter case, the additional PAL thread cost approximately 20% of the whole performance of carrying out the function.

Figure 8:
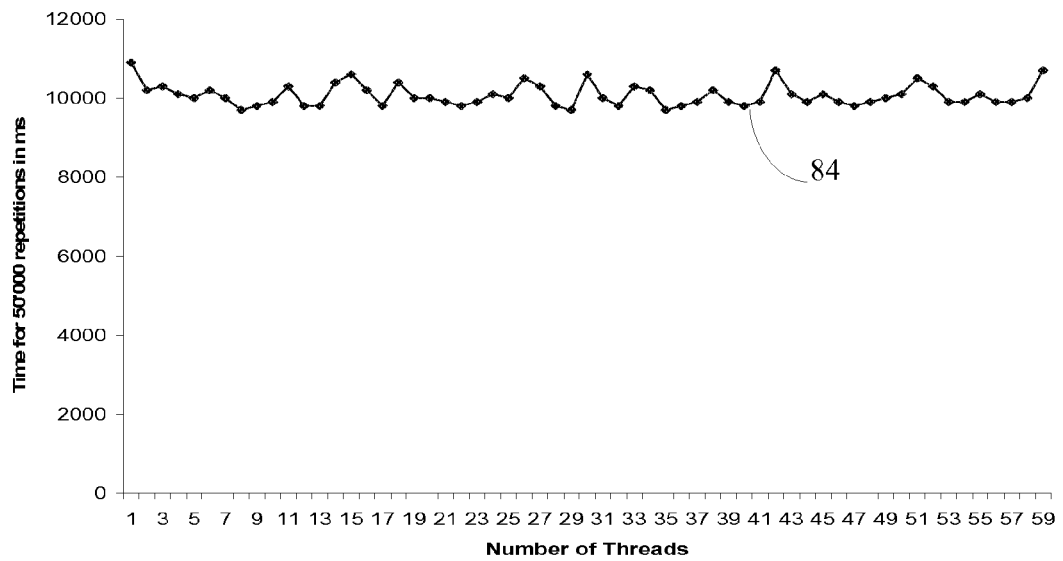
FIG. 8 is a graph that illustrates the impact of the number of application threads on the performance of carrying out sequenced platform adaptation layer functions on an emulator.
Figure 9:
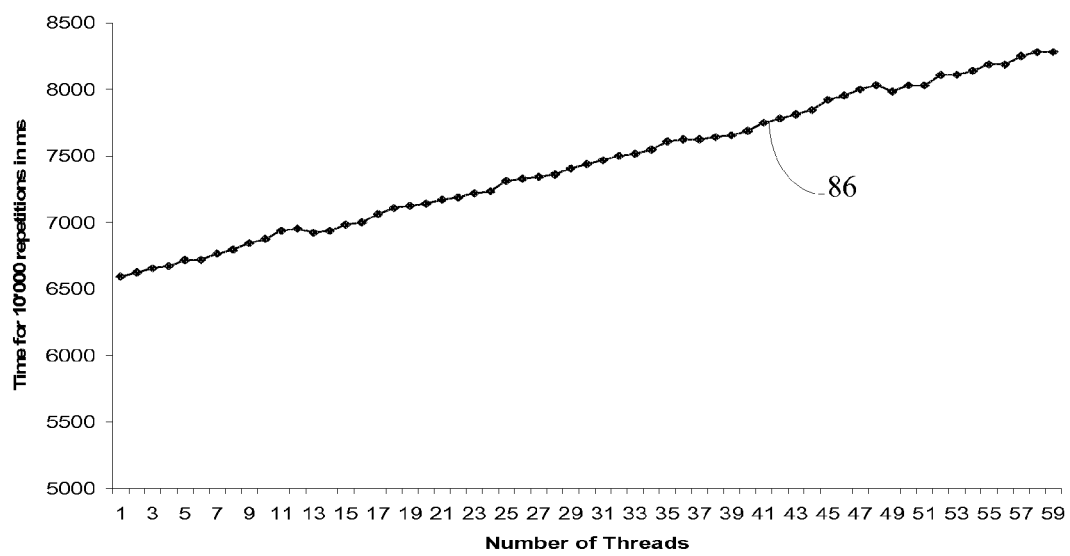
FIG. 9 is a graph that illustrates the impact of the number of application threads on the performance of carrying out sequenced platform adaptation layer functions on a resource-constrained device.

The fact that preemptively scheduled threads 64 cause significant performance penalties on resource-constrained devices 12 was also supported in the results from the following experiment. FIG. 8 and FIG. 9 show the time needed by an emulator (see trace 84) and a resource-constrained device (see trace 86) to execute a fixed number of PAL functions that are sequenced by a PAL thread 66 with respect to the number of application threads 58. Please note that both on the emulator and on the actual resource-constrained device all threads carried out nearly the same amount of function calls. For example, if the experiment consisted of carrying out 100,000 PAL function calls from 50 different application threads, the underlying operating system 28 distributed those calls equally such that each of the 50 application threads issued approximately 2,000 of these calls. No additional explicit synchronization was necessary. As can be seen in FIGS. 8 and 9, the impact of the number of threads does not have a big effect on the emulator, but the impact of the number of thread on the actual resource-constrained device is significant.

Figure 10:
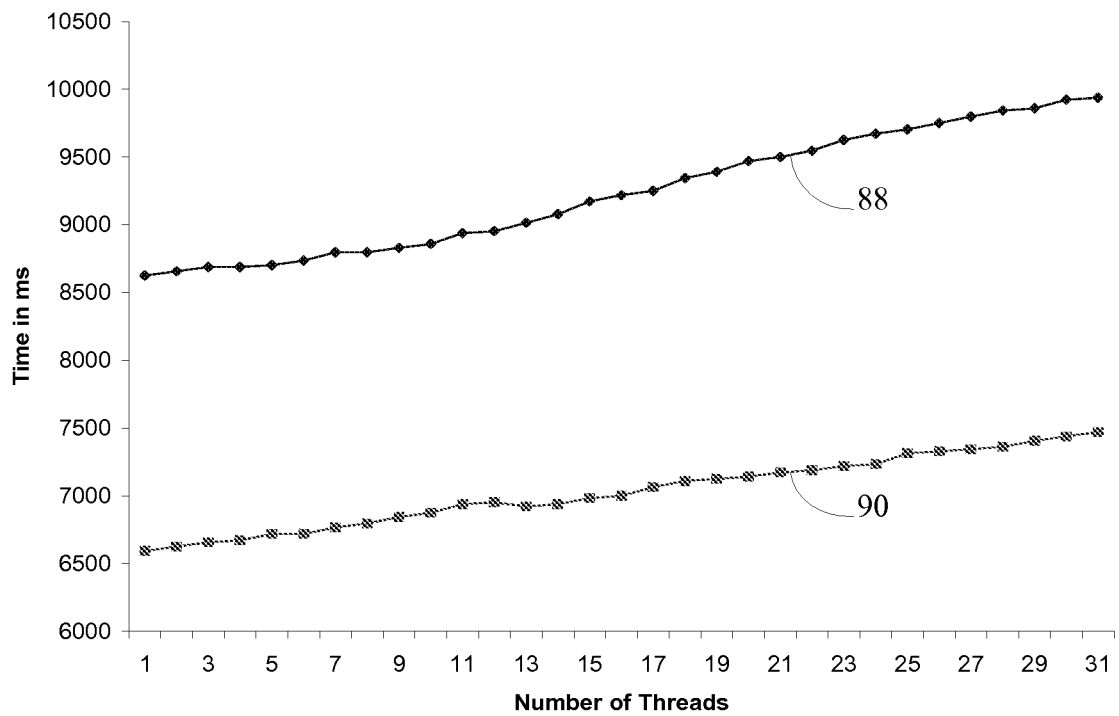
FIG. 10 is a graph that illustrates the impact of using managed versus unmanaged threads on the performance of a resource-constrained device.

Referring to FIG. 10, the last experiment deals with the overhead of managed threads (see trace 88) versus the overhead of pure threads (see trace 90) in the operating system 28. The same experiment as before was performed, but this time a C# program was written that was executed directly on the resource-constrained device 12 instead of using unmanaged code. The use of unmanaged code in the previous experiment was necessary to evaluate the impact of the underlying operating system. As can be seen in FIG. 10, the fact that managed threads need to maintain a range of additional data structures significantly impacts performance. This makes it even more necessary to apply the suggested optimization techniques to improve efficiency.

In summary, the above experimental results support the idea that the discussed optimizations have the potential to significantly improve the efficiency of virtual execution systems 20 on resource-constrained devices 12. Advantageously, these optimizations increase the awareness of a virtual execution system about the interrelations between managed functions, application specific characteristics, resource constraints of the underlying device, and properties of the operating system 28. In other words, the optimizations are facilitated by providing higher layers in the virtual execution system that are responsible for dealing with managed code with information about the effect of these calls on lower layers, e.g., the operating system layer. This is done by annotating managed code with additional metadata, which is used by the virtual execution system to carry out optimizations that map managed functions to appropriate calls and data structures on the platform adaptation layer 26 and operating system layer.

Advantageously, embodiments include a virtual execution system 20 that is configured to be used in a resource-constrained device 12 and to provide improvements during the execution of an application program 14. The resource-constrained device includes an operating system 28 and the application program, which includes instructions 16. The virtual execution system includes an execution engine 24, which is configured to execute the application program, and a PAL 26, which is configured to map calls from the execution engine upon the underlying operating system. Operating systems for resource-constrained devices provide different capabilities and have different restrictions than initially foreseen on desktop systems. To make use of the additional capabilities and to effectively overcome the restrictions of the operating systems on resource-constrained devices, non-functional aspects are used by the virtual execution system. The non-functional aspects characterize application instructions and allow the execution engine and the PAL to exploit the characteristics of the underlying operating system. The execution engine, together with the PAL, implements improvements during the execution of the application program based on the non-functional aspects. The improvements can affect performance or memory demands, as well as characteristics such as security or timeliness as expressed by the non-functional aspects.

Although the subject matter has been described in language that is specific to structural features and/or methodological acts, it is to be understood that the subject matter that is defined in the appended claims is not necessarily limited to the specific features or acts that are described above. Rather, the specific features and acts described above are disclosed as example forms of implementing the following claims. Moreover, although the term "step" may be used herein to connote different aspects of the methods that are employed, the term should not be interpreted as implying any particular order among or between various steps herein disclosed unless and except when the order of individual steps is explicitly described.

The invention claimed is:

1. A system comprising:
a resource-constrained device comprising:
  memory and one or more processors;
  an application program having instructions stored in the memory and executable by the one or more processors;
  an operating system stored in the memory and executable by the one or more processors to expose application program interfaces and runtime structures; and
  a virtual execution system stored in the memory comprising:
    an execution engine configured to execute the application program and to facilitate the compatibility of the application program with the operating system;
    wherein:
    the virtual execution system exposes a programming model comprising application program interfaces and runtime structures of the virtual execution system;
    the instructions are augmented by metadata that describe non-functional aspects comprising requirement characteristics of the instructions and characteristics of the operating system, the non-functional aspects including energy consumption information, the metadata having been added to the instructions (1) by a programmer on an instruction level, or (2) automatically for all instructions of a specific type based on profiles;

the execution engine is arranged to access the non-functional aspects; and the execution engine is arranged to use the non-functional aspects during the execution of the application program to facilitate a mapping from the programming model to the application program interfaces and the runtime structures of the operating system by using the non-functional aspects to find appropriate application program interfaces and runtime structures of the operating system.

2. The system according to claim 1, wherein the mapping results in improvements selected from the group consisting of improvements that affect performance, improvements that affect memory demands, improvements in security, and improvements in timeliness.

3. The system according to claim 2, wherein the non-functional aspects are selected from the group consisting of timeliness information, security information, function call information, resource demand information, memory restriction information, security constraint information, network lifetime information, real-time information, execution mode information, information that describes the relationship between managed functions, application-specific characteristics, resource constraints of the device, and properties of the operating system.

4. The system according to claim 1, wherein the non-functional aspects are selected from the group consisting of timeliness information, security information, function call information, resource demand information, memory restriction information, security constraint information, network lifetime information, real-time information, execution mode information, information that describes the relationship between managed functions, application-specific characteristics, resource constraints of the device, and properties of the operating system.

5. The system according to claim 1, wherein the non-functional aspects are described in metadata that is encoded in an intermediate language.

6. The system according to claim 5, wherein the virtual execution system includes a runtime technology that is selected from the group consisting of an open specification and a stack-oriented capability architecture; and wherein the intermediate language is selected from the group consisting of an object-oriented assembly language and bytecode instructions.

7. The system according to claim 6, wherein the operating system is selected from the group consisting of an open source operating system and software platform for smartphones and an open source component-based operating system and platform for wireless sensor networks.

8. The system according to claim 1, the memory comprising:

a first computer-readable storage device that includes the application program that has the instructions; and a second computer-readable storage device that includes the operating system that exposes the application program interfaces and runtime structures.

9. A system as claimed in claim 8, wherein the resource-constrained device is selected from the group consisting of a mobile phone, a personal digital assistant, a handheld computer, a game console, a set-top box, a satellite-based positioning device, and a sensor node.

10. A resource-constrained device comprising:

a first computer-readable storage device that includes an application program that has instructions;

a second computer-readable storage device that includes an operating system that exposes application program interfaces and runtime structures; and a virtual execution system that is configured to facilitate the compatibility of the application program with the operating system and to expose a program model;

wherein metadata of non-functional aspects having been added to the instructions and the operating system comprises the non-functional aspects, the virtual execution system has access to the non-functional aspects, the virtual execution system implements improvements during an execution of the application program based on the non-functional aspects, and the virtual execution system utilizes the non-functional aspects to facilitate a mapping from the programming model of the virtual execution system to the application program interfaces and the runtime structures of the operating system, the non-functional aspects including energy consumption information.

11. The resource-constrained device according to claim 10, wherein the non-functional aspects are selected from the group consisting of timeliness information, security information, function call information, resource demand information, memory restriction information, security constraint information, network lifetime information, real-time information, execution mode information, information that describes the relationship between managed functions, application-specific characteristics, resource constraints of the device, and properties of the operating system.

12. The resource-constrained device according to claim 10, wherein the resource-constrained device is selected from the group consisting of a mobile phone, a personal digital assistant, a handheld computer, a game console, a set-top box, a satellite-based positioning device, and a sensor node.

13. The resource-constrained device according to claim 10, wherein the non-functional aspects are described in metadata that is encoded in an intermediate language.

14. A method of implementing a virtual execution system, the method comprising:

under control of a resource-constrained device comprising one or more processors configured with executable instructions, an application program that has instructions, and an operating system which exposes application program interfaces and runtime structures:

identifying, by the virtual execution system, metadata added to the instructions, the metadata augmenting the instructions and describing non-functional aspects comprising requirement characteristics of the instructions and characteristics of the operating system, the non-functional aspects including energy consumption information;

providing the non-functional aspects to the virtual execution system; and using the non-functional aspects during an execution of the application program by the virtual execution system to facilitate a mapping from a programming model, exposed by the virtual execution system and comprising application program interfaces and runtime structures of the virtual execution system, to the application program interfaces and the runtime structures of the operating system by using the non-functional aspects to find appropriate application program interfaces and runtime structures of the operating system.

15. The method according to claim 14, wherein the virtual execution system provides threads, and the operating system provides servers; and further comprising sequencing the threads so all of the threads can access the servers.

16. The method according to claim 15, further comprising creating a separate server session for each access to a function that requires a server session and for each thread in the virtual execution system.

17. The method according to claim 14, wherein the operating system provides servers; and further comprising creating sessions to the servers, and using the virtual execution system to manage the sessions, and creating the sessions in an approach selected from the group consisting of creating sessions to all servers during startup of the virtual execution system, and creating sessions to the servers during runtime.

18. The method according to claim 17, wherein the virtual execution system is configured to facilitate preemptive multitasking, and the operating system exposes a non-preemptive multitasking model; and further comprising mapping preemptive multitasking in the virtual execution system onto the non-preemptive multitasking model of the operating system.

19. The method according to claim 14, wherein the virtual execution system is configured to provide preemptively scheduled threads for executing tasks and to be aware of what functions are mapped to asynchronous function calls in the operating system, and the operating system is configured to implement a threading model based on cooperative multitasking and to provide a lightweight threading model; further comprising an operation selected from the group consisting of:

reducing a number of preemptively scheduled threads by executing more than one task within a single thread; and using the lightweight threading model to improve the efficiency of executing concurrent tasks.

20. The method according to claim 14, wherein the virtual execution system is configured to facilitate preemptive multitasking, and the operating system exposes a non-preemptive multitasking model; and further comprising mapping preemptive multitasking in the virtual execution system onto the non-preemptive multitasking model of the operating system.

\* \* \* \* \*